United States Patent [19]

Cunningham et al.

[11] 4,073,247

[45] Feb. 14, 1978

[54] AUTOMATIC MACHINES

[75] Inventors: Sinclair Upton Cunningham; Douglas Jackson, both of Glasgow, Scotland

[73] Assignee: The Secretary of State for Industry in Her Britannic Majesty's Government of the United Kingdom of Great Britain and Northern Ireland, London, England

[21] Appl. No.: 643,834

[22] Filed: Dec. 23, 1975

[30] Foreign Application Priority Data

Dec. 23, 1974 United Kingdom ............... 55634/74

[51] Int. Cl.² ............................................ D05B 21/00
[52] U.S. Cl. ................................................. 112/121.12
[58] Field of Search ..................... 112/121.12, 121.11, 112/121.15, 262; 318/568

[56] References Cited

U.S. PATENT DOCUMENTS

| 3,385,245 | 5/1968 | Ramsey | 112/121.12 |
| 3,437,813 | 4/1969 | Eisengrein et al. | 112/121.12 X |
| 3,459,144 | 8/1969 | Ramsey et al. | 112/121.11 |
| 3,609,373 | 9/1971 | Desai et al. | 112/121.12 X |
| 3,624,371 | 11/1971 | Neal et al. | 318/568 X |
| 3,634,662 | 1/1972 | Slawson | 318/568 X |

Primary Examiner—Werner H. Schroeder
Assistant Examiner—Peter Nerbun
Attorney, Agent, or Firm—Cameron, Kerkam, Sutton, Stowell & Stowell

[57] ABSTRACT

An automatic machine for operating upon a work piece at a predetermined position with respect to a preselected physical feature, for example an edge, of the work piece. The machine scans the work piece and transmits signals corresponding to the co-ordinates of the physical feature to a computer. The computer thereafter controls in accordance with the signals received from the scanning head the position of the operating head, so that the operating head can operate upon the work piece at the pre-determined position with respect to the pre-selected physical feature.

11 Claims, 10 Drawing Figures

AUTOMATIC MACHINES

This invention relates to automatic machines.

The invention is concerned particularly with semi-automatic or fully-automatic machines which perform operations at one or more positions sequentially on each of a number of substantially identical workpieces; the positions having predetermined spatial relationships with respect to one or more preselected physical features of the workpiece. Such machines are often limited in scope and cannot process work when the dimensions of the physical features vary from one workpiece to another throughout the batch. The present invention is not so limited.

According to the present invention, there is provided an automatic machine for operating upon a work piece at a pre-determined position with respect to a pre-selected physical feature of the work piece comprising a work holder for holding a work piece; scanning head; operating head and a computer wherein the scanning head or the workholder is movable relative to the other and the operating head or the workholder is movable relative to the other and wherein the scanning head is capable of scanning a work piece located in the work holder to determine with respect to a pre-determined co-ordinate system the co-ordinates of a pre-selected physical feature of the work piece and to transmit signals corresponding to the co-ordinates to the computer and wherein the computer is capable of storing the co-ordinates of the position of the pre-selected physical feature received from the scanning head and in accordance therewith causing the operating head to operate upon the work piece at the pre-determined position with respect to the pre-selected physical feature.

The computer may also be capable of processing and passing on to the operating head other information regarding the nature of the operation which the operating head is required to perform on the workpiece.

The means for providing relative movement both between the operating head and the workholder and between the scanning head and the workholder may be servo-controlled motion devices — e.g. linear electric motors, hydraulic motors, pneumatic motors, screws driven by rotary electrical, hydraulic or pneumatic motors, or tension tapes driven by electrical, hydraulic or pnenumatic motors.

Both the operating head and the scanning head may be located in fixed positions with respect to the machine and a common means may provide the required movement of the workholder relative to both the operating head and the scanning head. Conveniently, the workholder may be attached to slides and may be moved by hydraulic cylinders, the movement of the workholder being measured by transducers and controlled by electro-hydraulic servo valves which are programmed from the computer processor.

A machine as hereinbefore described is particularly suitable for performing an operation sequentially on a plurality of substantially identical workpieces. In such an embodiment, it may be arranged that a first workpiece and a second workpiece can be attached to a single workholder so that the operating head can perform the required operation on the first workpiece during at least part of the time interval in which the scanning head scans the second workpiece. It may be arranged that motion of the second workpiece relative to the scanning head only takes place when the operating head is not in contact with the workpiece. Furthermore, it may be arranged that, when both the operating head has completed the operation on the first workpiece and the scanning head has completed scanning the required part of the second workpiece, the first workpiece is replaced by a third workpiece, and the positions of the second workpiece and the third workpiece are interchanged so that the operating head can operate on the second workpiece during at least part of the time interval in which the scanning head scans the third workpiece.

Preferably the preselected physical feature of the workpiece is a physical feature which can be easily detected by the scanning head — eg a chosen edge of the workpiece, a corner of the workpiece, or a hole through the workpiece.

The scanning head may, for example, comprise a linear array of light sensitive diodes and it may be arranged that the array can be aligned with respect to the workpiece in either of two mutually orthogonal directions, the direction of the array being chosen so that, at any location of the workpiece with respect to the scanning head, the array is aligned at a substantial angle to the physical feature of the workpiece. Alternatively the scanning head may comprise a matrix of light sensitive diodes. The co-ordinates of the position of the physical feature of the workpiece can then be read by the scanning head in two mutually orthongonal directions without the necessity for rotating the scanning head.

Initially, for a given workpiece, the scanning head may be taught which part of the workpiece it is required to scan in order to determine the location of the preselected physical feature. The teaching may be effected either by supplying data stored or fed into the computer processor, or by moving the workpiece manually relative to the scanning head. If the machine is required to perform an operation sequentially on a plurality of substantially identical workpieces, the scanning head may be taught in the aforesaid manner to scan the first workpiece and arranged to scan subsequent workpieces automatically. It will be understood by a person skilled in the art that it is advantageous to position subsequent workpieces in the workholder at approximately the same position as the first workpiece so that automatic scanning of the subsequent workpieces can be used.

Machines according to the invention can be used for performing operations at one or more discrete specified positions on the workpiece but they may be arranged to perform operations at a plurality of points which can be considered to form an extended position of operation.

Machines according to the invention can be arranged to carry out pre-determined sequences of operations on the workpieces. The data necessary for carrying out the sequence of operations can be stored by the computer as a sub-routine. If the machine is being used in a sewing function the sub-routine might for example control the embroidering of a pattern upon the workpiece.

In one particular application, a machine according to the invention is an automatic sewing machine for applying the top, or decorative, stitching to shirt collars. It is normally required to position the top, or decorative, stitching to a high degree of accuracy with respect to the edge of the shirt collars, particularly in the region of the points of the shirt collars. However, it will be understood by a person skilled in the art that machines according to the invention are not limited to this application and can be used, for example, for upholstery stitching and welding, glue spreading, routing, metal cutting or any other similar process particularly in the textile, shoe and car trades.

The invention will now be further described, by way of example only, with reference to the accompanying drawings of which.

Figure 1:
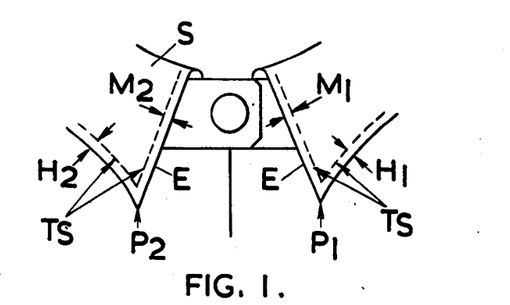
FIG. 1 illustrates a shirt collar which is required to be top stitched using a collar stitching machine according to the invention.

A shirt collar S having top stitching TS is shown in FIG. 1. The collar S has two points $P_1$ and $P_2$ and it is required to place the top stitching TS to a high degree of accuracy within a 50mm radius from the points $P_1$ and $P_2$. The top stitching TS is shown to be at distances $M_1 M_2 H_1$ and $H_2$ from the edge E of the collar S and the required accuracy of placement of the top stitching allows tolerances of $H_1 = H_2 \pm 0.2$mm and $M_1 = M_2 \pm 0.15$ mm.

Figure 2:
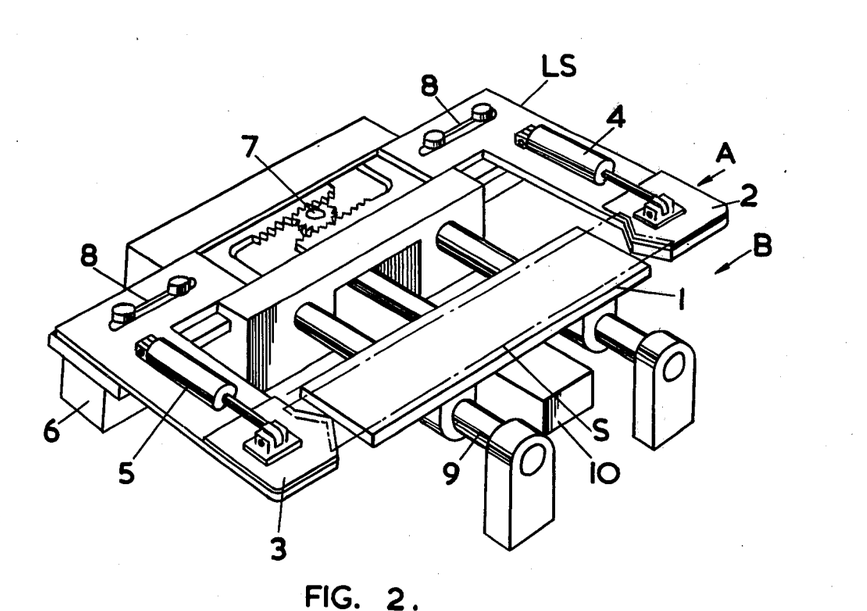
FIG. 2 is an oblique perspective view of a collar stretch and load unit for use in the collar stitching machine.

The shirt collar S, which has been run stitched, turned and pressed, and which is to be top stitched, is presented to the stitching machine in a load and stretch unit LS shown in FIG. 2. The collar S rests on a collar support plate 1 and is clamped at its outside edges by clamps 2 and 3 operated by air cylinders 4 and 5. The collar S is then stretched longitudinally by moving the clamps 2 and 3 apart using a variable pressure air cylinder 6, mechanically connected to a rack and pinion stretch mechanism 7. Slots 8 are provided so that the load and stretch unit LS can accept various sizes of collar S.

The load and stretch unit runs on slides 9 which allow it to move between a load station A and a transfer station B under the control of an actuating cylinder 10.

Figure 3:
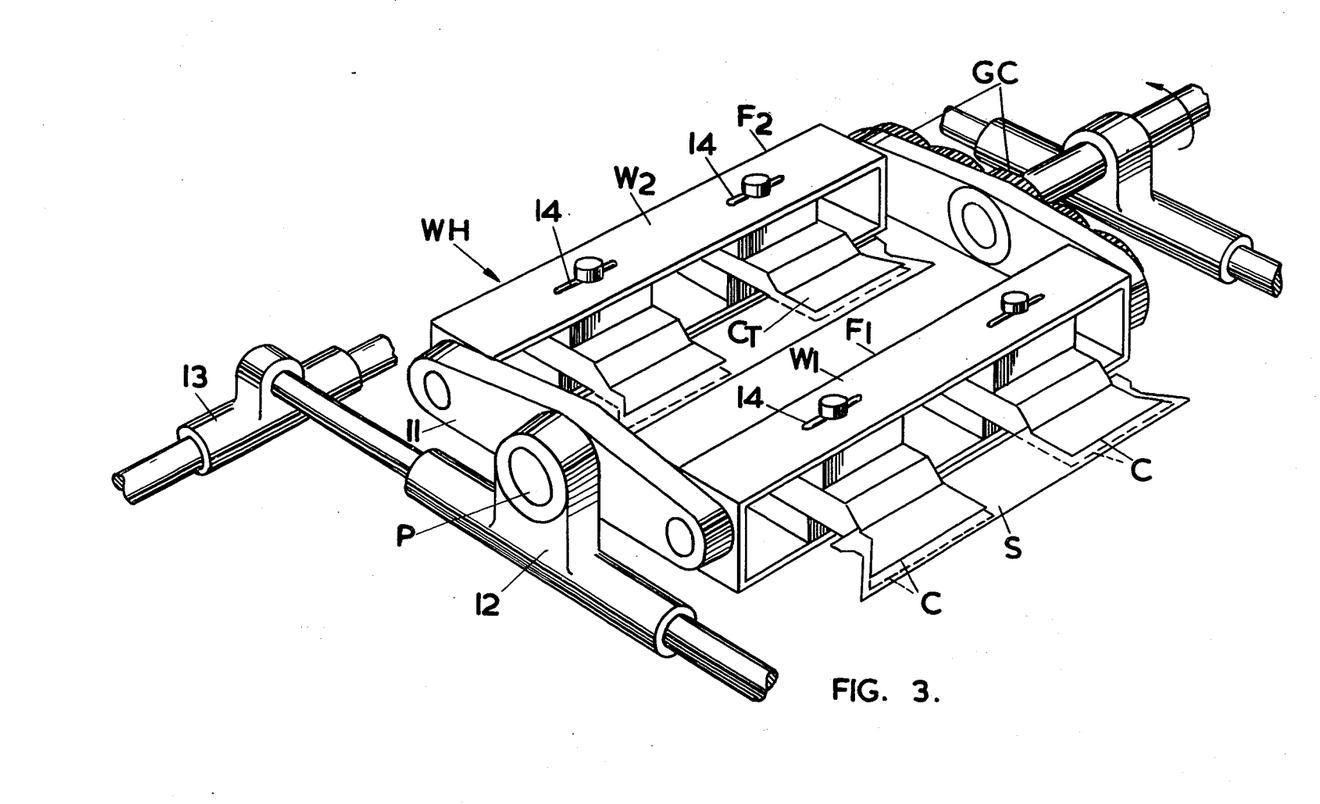
FIG. 3 is an oblique perspective view of a workholder for use in the collar stitching machine.

After stretching, the collar S is loaded into workpiece station $W_2$ of a workholder WH, shown in FIG. 3. The workholder WH comprises a carrier 11 having two workkpiece stations $W_1$ and $W_2$ and mounted on pivots P on a transverse slideway 12. The transverse slideway 12 is, in turn, mounted on a longitudinal slideway 13. Each workpiece station W consists of a framework F of hollow box-like cross-section which carries a pair of clamps C. The frameworks $F_1$ and $F_2$ are pivotably mounted in the carrier 11 and are linked by an epicyclic indexing gear train GC. Rotation of the carrier 11 about the pivots P is effected by an actuator (not shown) which can index the carrier 11 accurately through 180° to interchange the positions of the workpiece stations $W_1$ and $W_2$.

The clamps C are normally held in a closed position by springs (not shown). When the load and stretch unit LS moves to the transfer station B the clamps 2 and 3 pass through the framework F to offer the collar S to the workholder WH and the top clamp CT is forced upwards by a plunger (not shown) attached to the load and stretch unit. The collar S enters the clamps C and is clamped in position prior to the retraction of the load and stretch unit to the load station A. Slots 14 are provided in the frameworks $F_1$ and $F_2$ so that the longitudinal separation of the clamps C can be adjusted according to the size of the collar S.

Movement of the workholder WH along the transverse slideway 12 and the longitudinal slideway 13 is effected by respective transverse and longitudinal hydraulic cylinders (not shown), fed from electrohydraulic servo valves (not shown) which are controlled by a computer and is measured by respective transverse and longitudinal linear transducers TT and LT (see FIG. 8) linked to the computer.

Figure 4:
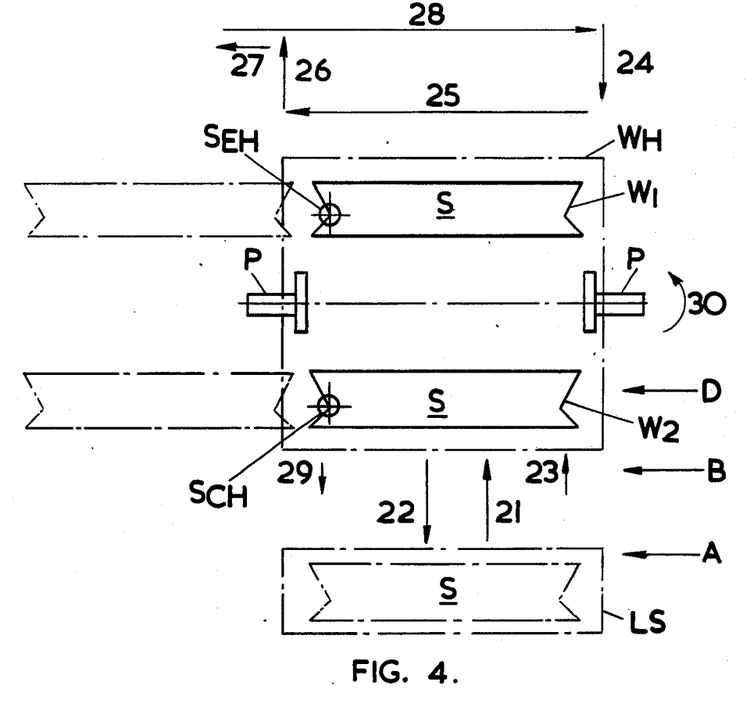
FIG. 4 is a schematic diagram showing the sequence of operations of the collar stitching machine.

The operating sequence of the collar stitching machine, shown schematically in FIG. 4, comprises the following sequence of operations:

(a) The collar S is loaded to the load and stretch unit LS at the load station A.

(b) The collar S is clamped and stretched in the load and stretch unit LS.

(c) The load and stretch unit LS is moved to the transfer station B — load and stretch unit movement 21 — and the collar S is presented to the workpiece station $W_2$ of the workholder WH.

(d) The collar S is clamped in the clamps C (see FIG. 3) of the workholder WH and the load and stretch unit is retracted to the load station A — load and stretch unit movement 22.

(e) The workholder WH is moved — workholder movement 23 — to a sew and scan station D to position the collar S in readiness for scanning the edge E (see FIG. 1) of the collar S by a scanning head SCH.

(f) The workholder is moved so that the scanning head SCH scans the edge E of the collar S — workholder movements 24, 25 and 26 — and the position of the edge E of the collar S is measured by the transducers TT and LT (see FIG. 8) and pased to the computer. Subsequently the workholder WH is moved to a collar unload station — workholder movement 27. Simultaneously an operator repeats operations (a) and (b).

(g) The workholder WH transverses quickly back to the sew and scan station D — workholder movement 28 — and retracts to the transfer station B — workholder movement 29.

(h) The workholder WH is indexed through 180° to interchange the stations $W_1$ and $W_2$ — workholder movement 30, and operations (c) to (g) are repeated using information fed from the computer to position the collar S in station $W_1$ correctly with respect to a sewing head SEH, fixed in relationship to the scanning head SCH so that the top stitching TS (see FIG. 1) is applied in the correct position. While the collar S at station $W_1$ is being stitched, the collar S at station $W_2$ is scanned. The operations (c) to (g) are repeated continuously throughout a batch of collars S.

Figure 5:
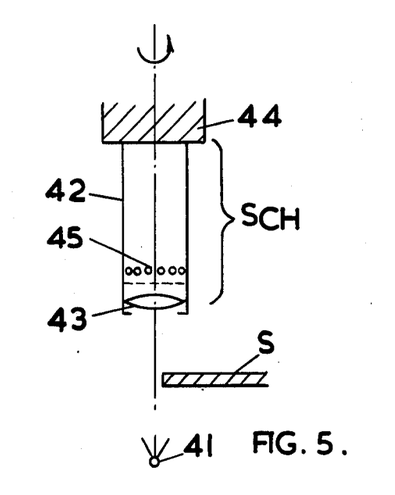
FIG. 5 shows a vertical section of the scanning head of the collar stitching machine.

The scanning system shown in FIG. 5 comprises a low-voltage tungsten light source 41 located beneath the collar S and the scanning head SCH, having a camera 42 and lens system 43, mounted on a rotary air actuator 44 approximately 6 inches above the collar. The camera 42 comprises a linear array 45 of 256 photosensitive diodes on 0.004 inch centres and the lens system 43 is arranged to give a linear field of view of approximately 1 inch.

When a collar in the station $W_1$ is being stitched mainly in a transverse direction — workholder movement 25 — the diode array 45 is arranged in a longitudinal direction. On reaching a corner of the collar S — eg a point P — the camera 43 is rotated through 90°, thus ensuring that when the collar S is being stitched mainly in a longitudinal direction, the array 45 is arranged in a transverse direction. This procedure is repeated at each corner.

Figure 6:
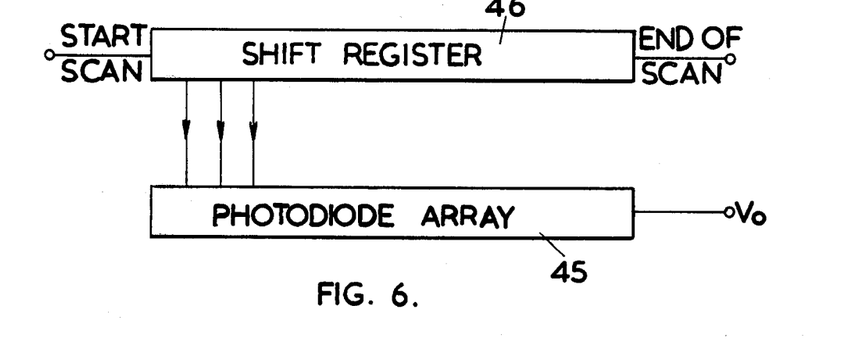
FIGS. 6 and 7 are respectively a block diagram and a circuit diagram illustrating the mode of operation of a diode array incorporated in the scanning head of the collar stitching machine.
Figure 7:
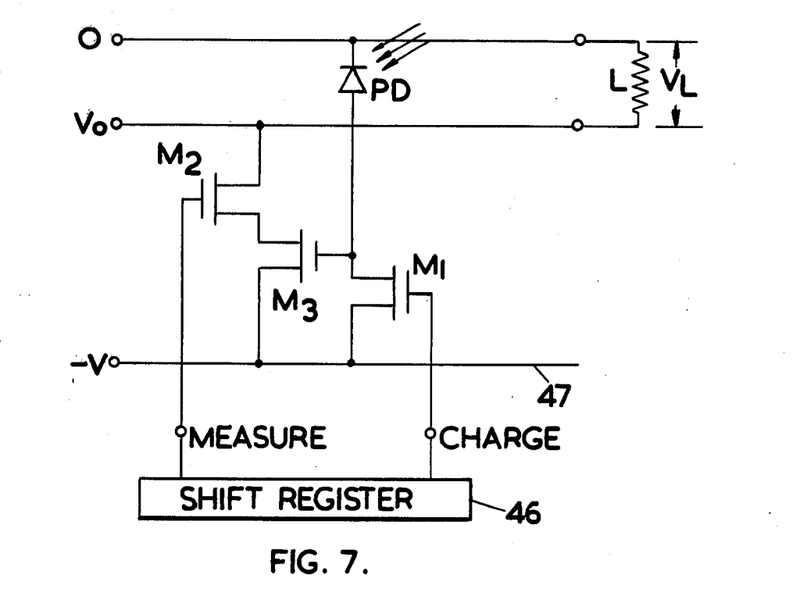

The mode of operation of the diode array 45 is shown in FIGS. 6 and 7. The diode array 45 is controlled by a shift register 46 operated by a START SCAN pulse derived from a clock (not shown). On START SCAN, pulses shift through the register 46, sequentially opening and closing the MOS switch $M_1$ to each photodiode PD, thereby connecting each photodiode PD in turn to a voltage line 47 to charge it to a negative potential $-V$ and then open-circuiting it. A small interval of time is allowed to elapse during which the tungsten light source 41 illuminates those diodes not hidden by the edge of the collar S, causing them to lose charge in proportion to the total amount of light incident during the interval. At the end of the time interval, a further clock pulse initiates operation of the register 46 to open and close a MOS switch $M_2$ sequentially to each photodiode PD to connect the voltage remaining across the photodiode PD via a buffer amplifier $M_3$ to a video output VO line connected to a load L. In this way, a voltage VL is developed across the load L proportional to the actual voltage across each photodiode PD in turn. Thus a series of pulses is obtained proportional to the number of photodiodes PD of the array 45 which are illuminated by the source 41 during the time interval.

Figure 8:
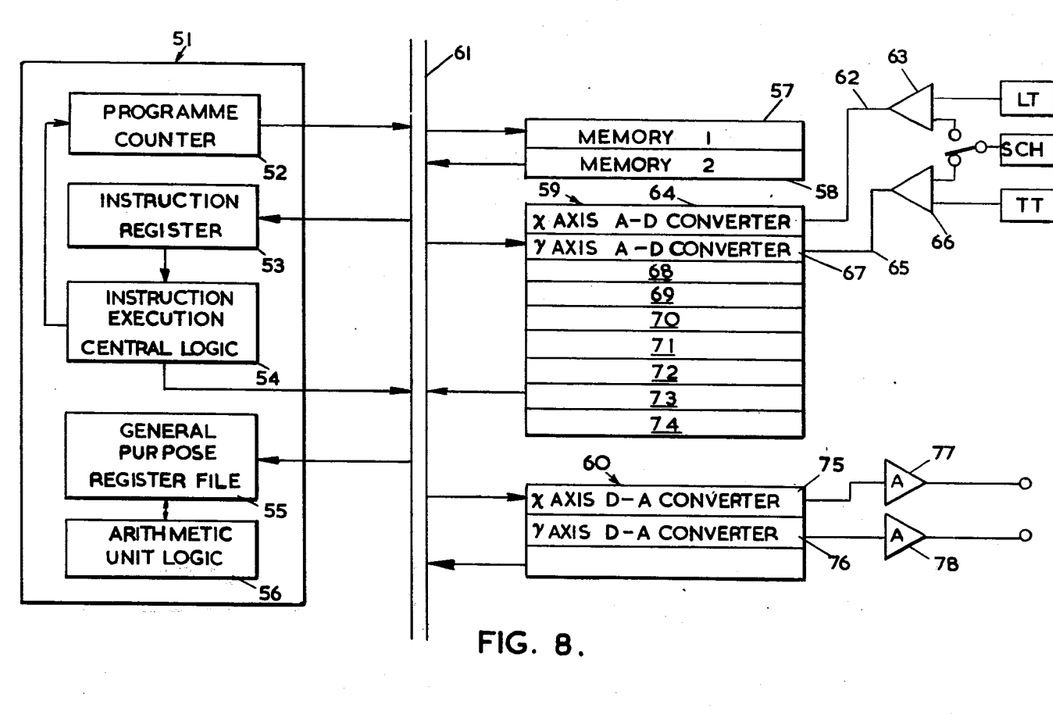
FIG. 8 is a schematic block diagram of a computer processor for use in controlling the operation of the collar stitching machine.

Referring to FIG. 8, the computer used for controlling the stitching machine is based on a central processing unit 51 which comprises a programme counter 52, an instruction register 53, an instruction and execution control logic circuit 54, a general purpose register file 55 and an arithmetic unit logic system 56. The computer further comprises two memory banks 57 and 58, a data input facility 59, a data output facility 60 and a connecting memory bar 61.

The input facility 59 is able to handle the following data inputs:
(a) an input 62 which is the output of a summer 63 having as inputs the position in an x direction of the workholder WH as measured by the longitudinal transducer LT and the output obtained from the photodiode array 45 if it is operating in the x direction. The input 62 is converted to digital form in an analogue to digital converter 64 for presenting to the central processing unit 51.
(b) An input 65 which is the output of a summer 66 having as inputs the position in a y direction of the workholder WH as measured by the transverse transducer TT and the output obtained from the photodiode array 45 if it is operating in the y direction. The input 65 is converted to digital form in an analogue to digital converter 67 for presenting to the central processing unit 51.
(c) Seven switch facilities:
 (i) a three digit switch 68 which allows manual setting of the distance normal to the edge of the collar S of the top stitching TS from 0 up to 1 inch to three decimal places.
 (ii) A three digit switch 69 which allows manual setting of the stitch length from 0.060 ins. up to 1 inch to three decimal places.
 (iii) A switch 70 to select round or pointed type of collar.
 (iv) A switch 71 to set any overstitching required at the beginning and end of the collars — the setting can be to a specific number of stitches or to a given length, in which case the central processing unit 51 will allow this to the nearest complete stitch.
 (v) A three position selector switch 72 to allow the following modes of operation: (a) scan collars and store data for subsequent stitching, (b) retain stitch path data for repeated use, and (c) on system start-up, scan the first collar without stitching.
 (vi) A three position switch 73 to select the type of stitching required around the button hole.
 (vii) A clock pulse input 74 derived from a photocell unit (not shown) attached to the sewing head which tells the central processor unit 51 when the needle is raised or lowered.

The output facility 60 comprises two digital-to-analogue converters 75 and 76 feeding respectively an x-direction servo amplifier 77 and a y-direction servo amplifier 78 to drive the workholder WH.

Programs defining the conversions necessary to give the final stitch path from the information received by the input facility 59 are held in the arithmetic unit logic 56.

Information received from the photodiode array 45 and the transducers LT and TT regarding the position of the collar S being scannd is stored in memory 57. The input information is requested at a rate consistent with adequate resolution and normally two readings of position are taken for every stitch.

While the workholders $W_1$ and $W_2$ are being indexed to interchange their positions and a new collar is being loaded into the workholder $WH_1$ the information from memory 57 together with information from the input switches 68 to 73 inclusive is fed to the central processing unit 51 which calculates each stitch position and flags corner approaches and actual corner positions. This information is then stored in memory 58.

Once another collar has been loaded, the information in memory 58 is clocked out by clock pulses 74 derived from the sewing needle which allows the workholder WH to travel during the period the needle is in the raised position. Three stitches away from a corner the sewing rate is decelerated to finally stop in the needle-down position in a corner. Stitching recommences once a signal is received to say that the scanning head SCH has rotated through 90°. Once more the stitching is slow for the first three stitches and speeds up to full rate until the approach of another corner when the corner procedure is repeated.

The machine may be used in a repetitive mode to control several slave machines which do not possess scan and processor capability.

Figure 9:
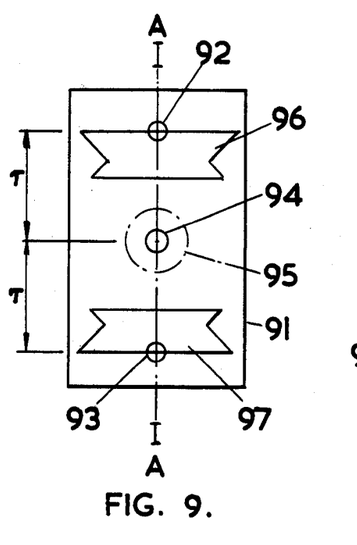
FIGS. 9 and 10 are diagrammatic plan views of a workholder adapted to function with polar co-ordinates.
Figure 10:
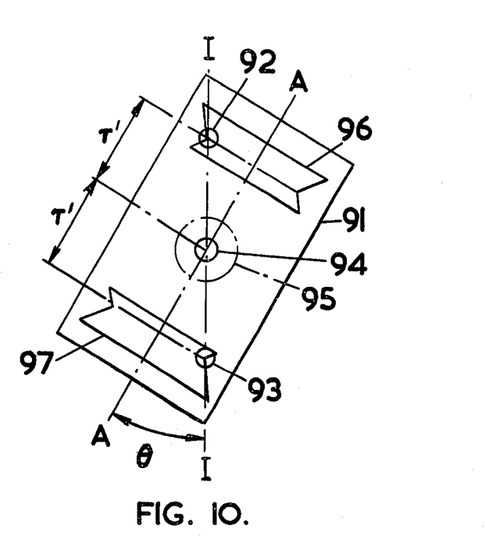

An alternative embodiment of the invention is one based upon a polar co-ordinate system as opposed to the cartesian system described in the previous embodiment. FIGS. 9 and 10 are plan views in very diagrammatic form of a workholder, scanning and sewing heads. The workholder 91 is rotatable about a pivot 94 at its centre by motor means (not shown) and a transducer 95 provides an electrical signal proportional to the angle through which the workholder 91 has been rotated from a predetermined datum line. The predetermined datum line may for example be the line I-I. While the workholder 91 is rotatable about its pivot 94 the operating head 92 and scanning head 93 do not rotate with the workholder and are fixed. The worholder 91 is arranged to hold two workpieces 96 and 97 and these are movable by motor means (not shown) along the centre line AA of the worholder. The motor means is arranged such that the workpieces are always equidistant from the predetermined datum point, i.e., the pivot 94. A transducer DT (not shown in FIGS. 9 and 10) provides an electrical signal proportional to the displacement of the workpieces 96 and 97 along the line A-A from the predetermined datum point. In this example the co-ordinates of the point being scanned by the scanning head 93 in FIG. 9 would be $r, \theta$. FIG. 10 shows the workholder 91 of FIG. 9 after it has been rotated through an angle $\theta$ from the predetermined datum line I-I. The co-ordinates of the point of the workpiece 97 being scanned by the scanning head 93 in FIG. 10 are $r^1, \theta$ where $r^1$ is the displacement of the workpieces 96 and 97 along the line A—A at an angle $\theta$ to the line I—I.

Figure 11:
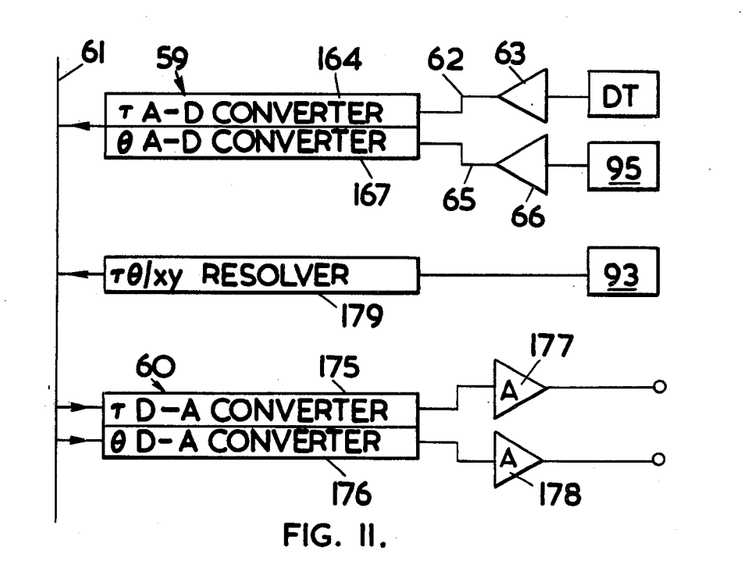
FIG. 11 is a block diagram of a portion of a computer for use in controlling the operation of a collar stitching machine using the workholder shown in FIGS. 9 and 10.

FIG. 11 shows a portion of the computer of FIG. 8 modified to operate with the polar co-ordinate system. The scanning head 93 derives its output, as in the previous embodiment, from the photodiode array which produces X or Y data. The resolver 179 receives the output from the scanning head 93 and converts the X or Y data to $r$ or $\theta$ data for presentation to the computer which adds the data to the appropriate axis. The summer 63 receives an input from the displacement transducer DT. Summer 66 receives an input from the transducer 95. The data input facility 59 received the outputs 62 and 65 from summers 63 and 66 respectively. Output 62 is applied to an analogue to digital convertor 164 for conversion to digital form, and similarly the output 65 is applied to an analogue to digital convertor 167 before presentation to the central processing unit 51 (see FIG. 8).

The data output facility 60 fed via memory bar 61 comprises two digital to analogue convertors 175 and 176 feeding respectively an $r$ direction servo amplifier 177 and a $\theta$ direction servo amplifier 178. The servo amplifier 177 drives the motor means which displaces the workpieces 96 and 97 along the line AA (see FIGS. 9 and 10) and the servo amplifier 178 drives motor means which rotates the workholder. Alternatively the transducers can be arranged to be encoders which produce a digital output for input direct to the computers memory bar 61. The servo amplifiers and motor means may also be arranged to accept a digital output from the computer.

We claim:

1. An automatic machine for operating upon a work piece at a predetermined position with respect to a preselected physical feature of the work piece comprising:

A work holder for holding a work piece,

Scanning means including a scanning head for scanning the work piece located in the work holder and for determining with respect to a predetermined coordinate system the co-ordinates of the preselected physical feature and for producing signals representative of said co-ordinates, An operating head for operating upon the work piece, Motor means for varying the relative positions of the operating head and the work holder, and A computer, connected to the scanning means and to the motor means, including a store for storing the co-ordinates of the position of said preselected physical feature and means for extracting data from its store and in accordance therewith means for causing the motor means to vary the relative position of the operating head and the workholder so that the operating head operates upon the work piece at said predetermined position.

2. An automatic machine as claimed in claim 1 wherein the scanning and operating heads are fixed relative to one another.

3. An automatic machine as claimed in claim 1 wherein the work holder includes means for holding two work pieces in discrete locations so that one work piece can be operated upon by the operating head at the same time as the other work piece is being scanned by the scanning head.

4. An automatic machine as claimed in claim 3 wherein the work holder includes means to interchange the positions of work pieces, means to release the work piece which has been operated upon and means to accept a further work piece.

5. An automatic machine as claimed in claim 1 wherein the store of the computer contains data extractable by the computer for controlling the relative movement between the scanning head and the work holder.

6. An automatic machine as claimed in claim 5 wherein the store of the computer contains data in the form of a subroutine extractable by the computer for controlling the operating head through a sequence of operations.

7. An automatic machine as claimed in claim 1 wherein the scanning means includes means for transmitting signals corresponding to the cartesian co-ordinates of the pre-selected physical feature of the work piece.

8. An automatic machine as claimed in claim 1 wherein the scanning means includes means for transmitting signals corresponding to the polar co-ordinates of the pre-selected physical feature of the workpiece.

9. An automatic machine as claimed in claim 1 wherein the scanning head includes a linear array of light sensitive diodes and the scanning means includes a light source so arranged that the light is directed onto said array and that a work piece when held by the work holder partially obscures the light emitted by said source.

10. An automatic machine as claimed in claim 1 wherein the scanning head includes a matrix of light sensitive diodes and the scanning means includes a light source so arranged that the light is directed onto said matrix and that a work piece when held by the work holder partially obscures the light emitted by said source.

11. An automatic machine as claimed in claim 1 wherein the operating head includes means for performing a stitching operation upon the work pieces which comprise relatively flat pieces of textile material and wherein the preselected physical feature of the work piece is the edge of the work piece.

* * * * *